(No Model.)
J. HARDING.
Nut Lock.
No. 230,009. Patented July 13, 1880.
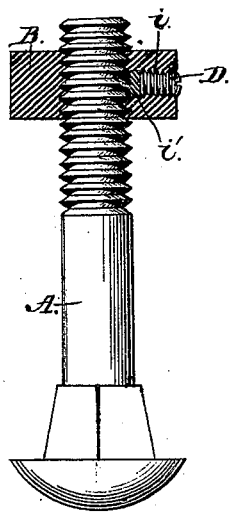
WITNESSES
John A. Ellis.
INVENTOR
Justus Harding
by E. W. Anderson
his, ATTORNEY

UNITED STATES PATENT OFFICE.

JUSTUS HARDING, OF EFFINGHAM, ILLINOIS.

NUT-LOCK.

SPECIFICATION forming part of Letters Patent No. 230,009, dated July 13, 1880.

Application filed May 26, 1880. (No model.)

*To all whom it may concern:*

Be it known that I, JUSTUS HARDING, of Effingham, in the county of Effingham and State of Illinois, have invented a new and valuable Improvement in Nut-Locks; and I do hereby declare that the following is a full, clear, and exact description of the construction and operation of the same, reference being had to the annexed drawing, making a part of this specification, and to the letters and figures of reference marked thereon.

The drawing is a representation of a side elevation of my improved nut-lock, partly in section.

This invention relates to improvements in nut-locks; and it consists in the combination of a threaded bolt, a nut applied thereon and having a threaded hole at right angles to its axis of rotation, a yielding plug in said hole, and a square or plane ended jam-screw applied in said hole, and when set up pressing the plug forcibly against the screw, thereby securing the nut effectually to the bolt, but avoiding injury to the screw-thread thereon, as will be hereinafter more fully explained.

In the annexed drawing, the letter A designates an ordinary screw-threaded bolt, and B is a nut applied thereon in the usual way and for the usual purposes, such as the securing of railroad fish-plates to the joints of the rails of the track, uniting bridge-timbers, and the like. This nut is provided at its side, at right angles to its axis of rotation, with a screw-threaded perforation or perforations, $i$, in which is placed a plug, $i'$, of leather, rubber, or other yielding material, of corresponding diameter.

D indicates a flat-ended screw, constructed with or without a head, and applied in perforations $i$. This screw, when forcibly set up, jams the plug forcibly against the threaded portion of the bolt, causing it to enter the threads thereof, and effectually securing the nut on the bolt against all casual rotation, caused by the jarring of the trains or machinery. The effect of the plug $i$ in the relation aforesaid is to protect the threads of the bolt from being injured by the end of the screw D; and while the nut may be readily reversed and taken off of the bolt by applying a wrench thereto, the threads of the bolt being intact, the said nut can in no wise turn upon the bolt from casual causes, but remains fixed when set up.

What I claim as new, and desire to secure by Letters Patent, is—

In a nut-lock, the combination, with a threaded bolt, of a nut applied thereon and having a threaded perforation at right angles to its axis of rotation, a yielding cushion or plug in said perforation, and a flat-ended screw applied in said perforation and jamming the cushion against the bolt, the whole arranged and operating substantially as specified.

In testimony that I claim the above I have hereunto subscribed my name in the presence of two witnesses.

JUSTUS HARDING.

Witnesses:
ADER H. KEPLEY,
H. B. KEPLEY.